US00RE47520E

(19) United States
(12) Reissued Patent
Zhang

(10) Patent Number: US RE47,520 E
(45) Date of Reissued Patent: Jul. 16, 2019

(54) SEPARATOR FOR A HIGH ENERGY RECHARGEABLE LITHIUM BATTERY

(71) Applicant: Zhengming Zhang, Rock Hill, SC (US)

(72) Inventor: Zhengming Zhang, Rock Hill, SC (US)

(73) Assignee: Celgard, LLC, Charlotte, NC (US)

(21) Appl. No.: 14/875,434

(22) Filed: Oct. 5, 2015

Related U.S. Patent Documents

Reissue of:
(64) Patent No.: 6,432,586
Issued: Aug. 13, 2002
Appl. No.: 09/546,266
Filed: Apr. 10, 2000

(51) Int. Cl.
*H01M 2/16* (2006.01)
*H01M 10/052* (2010.01)

(52) U.S. Cl.
CPC ..... *H01M 2/1686* (2013.01); *H01M 2/164* (2013.01); *H01M 2/166* (2013.01); *H01M 2/1653* (2013.01); *H01M 10/052* (2013.01)

(58) Field of Classification Search
CPC .. H01M 2/1686; H01M 2/1653; H01M 2/164; H01M 2/166; H01M 10/052
See application file for complete search history.

(56) References Cited

U.S. PATENT DOCUMENTS 1,673,421 A 6/1928 Petrie et al.
3,228,877 A 1/1966 Mahon
3,287,112 A 11/1966 Emil
3,426,754 A 2/1969 Bierenbaum et al.
3,542,596 A 11/1970 Arrance
3,679,538 A 7/1972 Druin et al.
3,679,540 A 7/1972 Zimmerman et al.
3,694,268 A 9/1972 Bergum
3,703,417 A 11/1972 Rosa et al.
3,709,774 A 1/1973 Kimura
3,749,604 A 7/1973 Langer et al.
3,755,034 A 8/1973 Mahon et al.
3,801,404 A 4/1974 Druin et al.
(Continued)

FOREIGN PATENT DOCUMENTS

DE 19914272 A1 10/1999
DE 2001325951 11/2001
(Continued)

OTHER PUBLICATIONS

Abraham, Directions in Secondary Lithium Battery research and Development, 1993, Electrochimica Acta, vol. 38, 16 Pages.
(Continued)

*Primary Examiner* — Ling X Xu
(74) *Attorney, Agent, or Firm* — Hammer & Associates, P.C.

(57) ABSTRACT

The instant invention is directed to a separator for a high energy rechargeable lithium battery and the corresponding battery. The separator includes a ceramic composite layer and a polymeric microporous layer. The ceramic layers includes a mixture of inorganic particles and a matrix material. The ceramic layer is adapted, at least, to block dendrite growth and to prevent electronic shorting. The polymeric layer is adapted, at least, to block ionic flow between the anode and the cathode in the event of thermal runaway.

28 Claims, 1 Drawing Sheet

Amended

(56) References Cited

U.S. PATENT DOCUMENTS 3,801,692 A 4/1974 Zimmerman
3,843,761 A 10/1974 Hay
3,853,601 A 12/1974 Taskier
3,861,963 A 1/1975 Afrance et al.
3,870,593 A 3/1975 Elton et al.
3,880,672 A 4/1975 Megahed et al.
4,086,401 A 4/1978 Sundberg et al.
4,138,459 A 2/1979 Brazinsky et al.
4,220,535 A 9/1980 Leonard
4,309,494 A 1/1982 Stockel
4,350,655 A 9/1982 Hoge
4,421,529 A 12/1983 Revak et al.
4,464,238 A 8/1984 Caldwell et al.
4,483,694 A 11/1984 Takamura et al.
4,539,256 A 9/1985 Shipman
4,588,633 A 5/1986 Kona et al.
4,600,633 A 7/1986 Kono et al.
4,620,955 A 11/1986 Kono et al.
4,650,680 A 3/1987 Brenner et al.
4,650,730 A 3/1987 Lundquist et al.
4,664,681 A 5/1987 Anazawa et al.
4,698,372 A 10/1987 Moss
4,707,267 A 11/1987 Johnson
4,726,989 A 2/1988 Mrozinski
4,731,304 A 3/1988 Lundquist et al.
4,752,305 A 6/1988 Johnson
4,777,073 A 10/1988 Sheth
4,849,144 A 7/1989 Mcloughlin
4,853,101 A 8/1989 Hruska et al.
4,911,985 A 3/1990 Jenkins et al.
4,923,650 A 5/1990 Antoon et al.
4,940,617 A 7/1990 Baurmeister
4,975,469 A 12/1990 Jacoby et al.
4,994,335 A 2/1991 Kamaei et al.
5,011,751 A 4/1991 Yoneyama et al.
5,071,686 A 12/1991 Genske et al.
5,091,272 A 2/1992 Treger
5,130,342 A 7/1992 McAllister et al.
5,154,988 A 10/1992 Choi et al.
5,176,968 A 1/1993 Blasi et al.
5,240,655 A 8/1993 Troffkin et al.
5,256,351 A 10/1993 Lustig et al.
5,264,171 A 11/1993 Prasad et al.
5,266,391 A 11/1993 Donato et al.
5,270,137 A 12/1993 Kubota
5,281,491 A 1/1994 Rein et al.
5,284,584 A 2/1994 Huang et al.
5,336,573 A 8/1994 Zuckerbrod et al.
5,427,872 A 6/1995 Shen et al.
5,449,457 A 9/1995 Prasad
5,460,896 A 10/1995 Takada et al.
5,480,745 A 1/1996 Nishiyama et al.
5,514,461 A 5/1996 Meguro et al.
5,529,707 A 6/1996 Kejha
5,565,281 A 10/1996 Yu et al.
5,620,807 A 4/1997 Mussell et al.
5,631,103 A * 5/1997 Eschbach et al. ..... 429/190
5,635,262 A 6/1997 Best et al.
5,654,114 A * 8/1997 Kubota et al. ..... 429/218
5,667,911 A 9/1997 Yu et al.
5,681,357 A 10/1997 Eschbach et al.
5,691,047 A 11/1997 Kurauchi et al.
5,691,077 A 11/1997 Yu
5,705,084 A 1/1998 Kejha
5,731,074 A 3/1998 Nishiyama et al.
5,741,608 A 4/1998 Kojima et al.
5,776,637 A 7/1998 Kashio et al.
5,824,430 A 10/1998 Higuchi et al.
5,824,434 A 10/1998 Kawakami et al.
5,849,433 A * 12/1998 Venugopal et al. ..... 429/190
5,853,916 A 12/1998 Venugopal et al.
5,910,225 A 6/1999 Mcamish et al.
5,922,492 A 7/1999 Takita et al.
5,938,874 A 8/1999 Palomo et al.
5,952,120 A 9/1999 Yu et al.
5,981,107 A 11/1999 Hamano et al.
6,057,060 A 5/2000 Yu
6,057,061 A 5/2000 Callahan et al.
6,080,507 A 6/2000 Yu
6,096,101 A 8/2000 Liu et al.
6,096,213 A 8/2000 Radovanovic et al.
6,132,654 A 10/2000 Yu
6,168,648 B1 1/2001 Ootani et al.
6,180,280 B1 1/2001 Spotnitz
6,200,703 B1 3/2001 Kashio et al.
6,235,430 B1 5/2001 Hoshina et al.
6,242,135 B1 * 6/2001 Mushiake ..... 429/304
6,248,476 B1 6/2001 Sun et al.
6,251,540 B1 6/2001 Kejha
6,287,720 B1 9/2001 Yamashita et al.
6,299,778 B1 10/2001 Penth et al.
6,309,545 B1 10/2001 Penth et al.
6,346,350 B1 2/2002 Call et al.
6,348,286 B1 2/2002 Tanaka et al.
6,368,742 B2 4/2002 Fisher et al.
6,383,386 B1 5/2002 Hying et al.
6,420,070 B1 7/2002 Kasamatsu et al.
6,423,445 B1 7/2002 Kato et al.
6,447,958 B1 9/2002 Shinohara et al.
6,475,666 B1 11/2002 Takeuchi
6,506,524 B1 1/2003 Mcmillan et al.
6,509,118 B1 1/2003 Pavlov et al.
6,511,774 B1 1/2003 Tsukuda et al.
6,537,334 B1 3/2003 Dupasquier et al.
6,602,593 B1 8/2003 Callahan et al.
6,620,320 B1 9/2003 Hying et al.
6,627,346 B1 9/2003 Kinouchi et al.
6,632,561 B1 10/2003 Bauer et al.
6,664,007 B2 12/2003 Hamano et al.
6,679,925 B1 1/2004 Tanizaki et al.
6,713,217 B2 3/2004 Oura et al.
6,749,961 B1 6/2004 Nguyen et al.
7,112,389 B1 9/2006 Arora et al.
7,323,274 B1 1/2008 Samii et al.
2001/0000485 A1 4/2001 Ying et al.
2001/0008734 A1 7/2001 Dupasquier et al.
2001/0021421 A1 9/2001 Witham et al.
2002/0102455 A1 8/2002 Daroux
2002/0110732 A1 8/2002 Coustier et al.
2002/0136945 A1 9/2002 Call et al.
2002/0166802 A1 11/2002 Jung et al.

FOREIGN PATENT DOCUMENTS

EP 259128 A2 3/1988
EP 262179 A1 4/1988
EP 352802 A2 1/1990
EP 259128 B1 1/1992
EP 0651455 A1 5/1995
EP 0730316 A1 9/1996
EP 872900 A2 10/1998
EP 951080 B1 10/1999
EP 19914272 * 10/1999 ..... H01M 2/14
EP 1416552 A2 5/2004
FR 1544807 A 11/1968
GB 2005289 A 4/1979
GB 298817 A 9/1996
JP 08-287897 A2 11/1986
JP 02020531 A 1/1990
JP 282457 A 3/1990
JP 05-190208 A1 7/1993
JP 05211059 A 8/1993
JP 06163023 A 6/1994
JP 06196199 A 7/1994
JP 06-325747 A1 11/1994
JP 07053748 2/1995
JP 7173323 A 7/1995
JP 07220759 A 8/1995
JP 7220761 8/1995
JP 08138644 A 5/1996
JP 08250097 A 9/1996
JP 8250127 A 9/1996
JP 08323910 12/1996
JP 09082312 A 3/1997

(56) References Cited

FOREIGN PATENT DOCUMENTS

| | | | | |
|---|---|---|---|---|
| JP | 2642206 | B2 | 8/1997 | |
| JP | 09255808 | | 9/1997 | |
| JP | 09283117 | A | 10/1997 | |
| JP | 09-289040 | A1 | 11/1997 | |
| JP | 09-306543 | A1 | 11/1997 | |
| JP | 09293518 | | 11/1997 | |
| JP | 10006453 | A | 1/1998 | |
| JP | 10007831 | | 1/1998 | |
| JP | 10017694 | A | 1/1998 | |
| JP | 10-261437 | A2 | 8/1998 | |
| JP | 10-284039 | A1 | 10/1998 | |
| JP | 11003709 | A | 1/1999 | |
| JP | 11-060790 | A1 | 3/1999 | |
| JP | 11-67273 | A1 | 3/1999 | |
| JP | 11-080395 | A | 3/1999 | |
| JP | 11-086628 | A1 | 3/1999 | |
| JP | 11102686 | | 4/1999 | |
| JP | 11-213982 | A1 | 5/1999 | |
| JP | 11250937 | A | 9/1999 | |
| JP | 11-283674 | A1 | 10/1999 | |
| JP | 11273726 | A | 10/1999 | |
| JP | 11-329395 | A1 | 11/1999 | |
| JP | 2000030686 | A | 1/2000 | |
| JP | 2002240215 | | 8/2002 | |
| JP | 2002334689 | | 11/2002 | |
| JP | 200439649 | | 2/2004 | |
| JP | 2004156975 | | 6/2004 | |
| JP | 2004288614 | | 10/2004 | |
| KR | 100745586 | B1 | 7/2007 | |
| TW | 460505 | B | 10/2001 | |
| WO | 94/20995 | A3 | 9/1994 | |
| WO | 9720885 | A1 | 6/1997 | |
| WO | 98/59387 | A2 | 12/1998 | |
| WO | WO 98/59387 | * | 12/1998 | ..... H01M 10/40 |
| WO | 9916138 | A1 | 4/1999 | |
| WO | 99/33125 | A1 | 7/1999 | |
| WO | 9944245 | | 9/1999 | |

OTHER PUBLICATIONS

Abraham, et al., Characterization of Ether Electrolytes for Rechargeable Lithium Cells, 1982, Journal of the Electrochemical Society, vol. 129, 6 Pages.

Abraham, et al., Inorganic-Organic Composite Solid Polymer Electrolytes, 2000, Journal of the Electrochemical Society, vol. 147, 6 pages.

Abraham, et al., Polymer Electrolytes Reinforced by Celgard Membranes, Mar. 3, 1995, J. Electrochem. Soc., vol. 142, 5 Pages.

Abraham, et al., Rechargeability of the Ambient Temperature Cell Li/2Me-THF, LiAsF6/Cr0.5V0.5S2, 1983, Journal of the Electrochemical Society, vol. 130, 6 pages.

Claim Chart comparing Claims 1 and 3-6 of the '586 patent to the Disclosure of Kojima, Submitted by Sumitomo in IPR 2013-00637, 2 Pages.

Claim Chart comparing Claims 1-3, 5-6 and 11 of the '586 patent to the Disclosure of Shinohara, Submitted by Sumitomo in IPR 2013-00637, 2 Pages.

Claim Chart comparing Claims 1-6 and 11 of the '586 patent to the Disclosure of JP '395, Submitted by Sumitomo in IPR 2013-00637, 3 Pages.

Claim Chart comparing Claims 1-6 and 11 of the '586 patent to the Disclosure of Lundquist, Submitted by Sumitomo in IPR 2013-00637, 3 Pages.

File History for EP Application No. 01106513.3, Submitted by Sumitomo in IPR 2013-00637, 92 Pages.

Geiger, et al., Advanced Separators for Lithium Batteries, 1994, 13 pages.

Petition for Inter Partes Review of U.S. Pat. No. 6,432,586, Submitted by Sumitomo in IPR2013-00637, Sep. 30, 2013, 64 pages.

Allock, et al., Contemporary Polymer Chemistry, 1981, 5 Pages.

American National Standards Institute, Inc., American National Standard for Portable Rechargeable Cells and Batteries, 1999, 48 Pages.

Besenhard, et al., Excerpts from the Handbook of Battery Materials, 14 pages.

Choe, et al., Characterization of Some Polyacrylonitrile-Based Electrolytes, 1997, Chem. Mater., vol. 9, 11 Pages.

Patent Owner's Motion for Observation on Cross-Examination of Dr. Abraham, Submitted by Celgard, LLC in IPR2014-00524, Jun. 1, 2015, 6 pages.

Declaration of C. Glen Wensley, Ph.D. Submitted by Celgard, LLC in IPR2014-00524, 13 Pages.

Declaration of Kuzhikalail M. Abraham, Ph.D. ISO Petitioner's Reply, Submitted by Mitsubishi Plastics, Inc. in IPR2014-00524, 20 Pages.

Declaration of Kuzhikalail M. Abraham, Ph.D., Submitted by Mitsubishi Plastics, Inc. in IPR2014-00524, 55 Pages.

Declaration of Premanand Ramadass, Submitted by Celgard, LLC in IPR2014-00524, 23 Pages.

Declaration of Premanand Ramadass, Submitted by Mitsubishi Plastics, Inc. in IPR2014-00524, 26 Pages.

Declaration of Ralph E. White, Ph.D., P.E. ISO Preliminary Injunction, Submitted by Celgard, LLC in IPR2014-00692, 229 Pages.

Declaration of Ralph E. White, Ph.D., P.E., Submitted by Celgard, LLC in IPR2014-00524, 70 Pages.

Declaration of William J. Paulus, Submitted by Celgard, LLC in IPR2014-00524, 10 Pages.

Dias, et al., Trends in Polymer Electrolytes for Secondary Lithium Batteries, 2000, Journal of Power Sources, vol. 88, 23 Pages.

Doyle, et al., Modeling of Galvanostatic Charge and Discharge of the Lithium/Polymer /Insertion Cell, 1993, J. Electrochem. Soc., vol. 140, 8 Pages.

Excerpts from Jan. 29, 2015 Deposition of Kuzhikalail M. Abraham, Ph.D., Submitted by Celgard, LLC in IPR2014-00524, 43 Pages.

Excerpts from May 20, 2015 Deposition of Kuzhikalail M. Abraham, Ph.D., Submitted by Celgard, LLC in IPR2014-00524, 61 Pages.

File History for EP 1105613, Submitted by Mitsubishi Plastics, Inc. in IPR2014-00524, 92 Pages.

File History for JP 2001-110899 (partial trans), Submitted by Mitsubishi Plastics, Inc. in IPR2014-00524, 24 Pages.

File History for JP 2001-110899, Submitted by Mitsubishi Plastics, Inc. in IPR2014-00524, 106 Pages.

File History for KR 10-2001-0017994 (partial trans), Submitted by Mitsubishi Plastics, Inc. in IPR2014-00524, 18 Pages.

File History for KR 10-2001-0017994, Submitted by Mitsubishi Plastics, Inc. in IPR2014-00524, 92 Pages.

File History for KR 10-2008-0119658 (partial trans), Submitted by Mitsubishi Plastics, Inc. in IPR2014-00524, 14 Pages.

File History for KR 10-2008-0119658, Submitted by Mitsubishi Plastics, Inc. in IPR2014-00524, 99 Pages.

File History for KR 10-2010-0025257 (partial trans), Submitted by Mitsubishi Plastics, Inc. in IPR2014-00524, 6 Pages.

File History for KR 10-2010-0025257, Submitted by Mitsubishi Plastics, Inc. in IPR2014-00524, 47 Pages.

Institution Decision, Submitted by Patent Trial and Appeal Board in IPR2014-00524, Sep. 29, 2014, 27 pages.

Jiang, et al., Studies of Some Poly (vinylidene fluoride) Electrolytes, 1997, Electrochimica Acta, vol. 42, 11 Pages.

McGraw-Hill, Encyclopedia of Science, 1997, 8th Edition, 15 pages.

Motion to Submit Supplemental Evidence, Submitted by Mitsubishi Plastics, Inc. in IPR2014-00524, Oct. 29, 2014, 6 pages.

Motion to Submit Supplemental Information, Submitted by Mitsubishi Plastics, Inc. in IPR2014-00524, Nov. 10, 2014, 15 pages.

Newman, Excerpts from Electrochemical Systems, 1991, 2nd Edition, 3 pages.

Opposition to Celgard's Motion for Observation on Cross Examination, Submitted by Mitsubishi Plastics, Inc. in IPR2014-00524, Jun. 8, 2015, 5 pages.

(56) References Cited

OTHER PUBLICATIONS

Patent Owner's Opposition to Petitioner's Motion to Submit Supplemental Information, Submitted by Celgard, LLC in IPR2014-00524, Nov. 17, 2014, 16 pages.
Patent Owner's Response, Submitted by Celgard, LLC in IPR2014-00524, Feb. 6, 2015, 39 pages.
Petitioner's Reply in IPR2014-00692, Submitted by Celgard, LLC in IPR2015-01511, 35 pages.
Declaration of Kuzhikalail M. Abraham, Ph.D., Submitted by Sumitomo in IPR 2013-00637, 32 Pages.
Periasamy, et al., Studies on PVdF-Based Gel Polymer Electrolytes, 2000, Journal of Power Sources, vol. 88, 5 pages.
Petition for Inter Partes Review of U.S. Pat. No. 6,432,586, Submitted by Mitsubishi Plastics, Inc. in IPR2014-00524, Mar. 20, 2014, 64 pages.
Petitioner's Reply in IPR2014-00679, Submitted by Celgard, LLC in IPR2015-01511, 31 pages.
Petitioner's Reply to Patent Owner Response, Submitted by Mitsubishi Plastics, Inc. in IPR2014-00524, May 4, 2015, 28 pages.
Petitioner's Request for Rehearing, Submitted by Mitsubishi Plastics, Inc. in IPR2014-00524, Oct. 14, 2014, 20 pages.
Petition for Inter Partes Review of U.S. Pat. No. 6,432,586, Submitted by Ube Maxell Co., Ltd. in IPR2015-01511, Jun. 25, 2015, 70 pages.
Preliminary Response, Submitted by Celgard, LLC in IPR2014-00524, Jul. 2, 2014, 35 pages.
Song, et al., Review of Gel-Type Polymer Electrolytes for Lithium-Ion Batteries, 1999, Journal of Power Sources, vol. 77, 15 pages.
Besenhard, et al., Excerpts from the Handbook of Battery Materials, 1999, 1st Edition, 11 pages.
Besenhard, et al., Excerpts from the Handbook of Battery Materials, 4 pages, 1999.
Declaration of C. Glen Wensley, Ph.D. Submitted by Celgard, LLC in IPR2014-00679, 23 Pages.
Declaration of Craig B. Arnold, Submitted by SK Innovation Co., Ltd. in IPR2014-00679, 64 Pages.
Crowther, et al., Effect of Electrolyte Composition on Lithium Dendrite Growth, 2008, Journal of the Electrochemical Society, vol. 155, 6 Pages.
Declaration of Ralph E. White, Ph.D., P.E., Submitted by Celgard, LLC in IPR2014-00679, 88 Pages.
Merriam-Webster, Membrane and Micropore Definitions, Sep. 23, 2013, http://www.merriam-webster.com/dictionary/membrane, http://www.merriam-webster.com/dictionary/microporous, 6 Pages.
Declaration of William J. Paulus, Submitted by Celgard, LLC in IPR2014-00679, 10 Pages.
Excerpts from Apr. 17, 2015 Deposition of Ralph E. White, Ph.D., P.E., Submitted by SK Innovation Co., Ltd. in IPR2014-00679, 189 Pages.
Excerpts from Jan. 28, 2015 Deposition of Craig B. Arnold, Submitted by Celgard, LLC in IPR2014-00679, 71 Pages.
Final Decision, Submitted by Patent Trial and Appeal Board in IPR2014-00679, Sep. 25, 2015, 57 pages.
Institution Decision, Submitted by Patent Trial and Appeal Board in IPR2014-00679, Sep. 29, 2014, 26 pages.
Lewis, et al., Excerpts from Hawley Condensed Chemical Dictionary, 1997, 13th Edition, 6 pages.
Linden, et al., Excerpts from the Handbook of Batteries, 1995, 2nd Edition, 11 pages.
McGraw-Hill, Dictionary of Scientific and Technical Terms, 1994, 5th Edition, 3 Pages.
Merriam-Webster, Incorporated, Merriam-Webster's Collegiate Dictionary, 2000, 10th Edition, 4 Pages.
Patent Owner's Preliminary Response, Submitted by Celgard, LLC. in IPR2014-00679, May 9, 2014, 38 pages.
Yasuda Seiki Seisakusho Ltd., No. 323-Auto Automatic Gurley Type Densometer, Apr. 20, 2004, http:/WMN.yasuda-seiki.eo.jp/e/products/323-AUTO.hlrrl, 1 Page.
Petition for Inter Partes Review of U.S. Pat. No. 6,432,586, Submitted by SK Innovation Co., Ltd. in IPR2014-00679, May 9, 2014, 69 pages.
Tappi, Air resistance of Paper (Gurley Method), Test Method TAPPI/ANSI T 460 om-11, 2014, 1 Page.
Merriam-Webster, Storage Battery, Aug. 17, 2014, http://www.merriam-mbster.com'dictionary/storage%20battery, 2 Pages.
Wikipedia, Poly(ethylene glycol) diacrylate, http:/twww.sigmaaldrich.com/catalog/producValdrich/455008?1ang=en&region=US, Jun. 18, 2015, 3 Pages.
Wikipedia, Aluminium oxide, https://en.wikipedia.org/wiki/Aiuminium_oxide, Jun. 17, 2015, 9 Pages.
Ceramtac, Oxide Ceramics—Aluminum Oxide (AI203), https:/lwww.ceramtec.com/ceramic-materials/aluminum-oxide/, 5 Pages.
Random House Webster's College Dictionary, 2000, 2nd Edition, 4 pages.
Love, et al., Diagnostic Tools for Lithium-ion Battery State-of-Health Monitoring, U.S. Naval Research Laboratory, Code 6113, Alternative Energy Section, 28 Pages.
Standard Test Method for Resistance of Nonporous Paper to Passage of Air, 1999, 3 pages.
Yamaki, et al., A Consideration of the Morphology of Electrochemically Deposited Lithium in an Organic Electrolyte, 2000, Journal of Power Sources, vol. 74, 9 pages.
Declaration of Craig B. Arnold, Submitted by SK Innovation Co., Ltd. In IPR2014-00680, 77 Pages.
Love, et al., Thermomechanical analysis and durability of commercial micro-porous polymer Li-ion battery separators, 2011, Journal of Power Sources, vol. 196, 8 pages.
Chaturvedi, et al., Algorithms for Advanced Battery-Management Systems, Digital Object Identifier, Jun. 2010, IEEE Control Systems Magazine, 21 Pages.
Brian, Marshall, How Lithium-ion Batteries Work, Jun. 17, 2015, HowStuffWorks, http://electronics.howstuffworks.com/everydaytech/lithiumionbattery.htm, 5 pages.
Declaration of Ralph E. White, Ph.D., P.E., Submitted by Celgard, LLC in IPR2014-00680, 67 Pages.
Declaration of William J. Paulus, Submitted by Celgard, LLC in IPR2014-00680, 10 Pages.
Excerpts from Apr. 17, 2015 Deposition of Ralph E. White, Ph.D., P.E., Submitted by SK Innovation Co., Ltd., in IPR2014-00680, 67 Pages.
Excerpts from Jan. 28, 2015 Deposition of Craig B. Arnold, Submitted by Celgard, LLC in IPR2014-00680, 114 Pages.
Final Decision, Submitted by Patent Trial and Appeal Board in IPR2014-00680, Sep. 25, 2015, 33 pages.
Institution Decision, Submitted by Patent Trial and Appeal Board in IPR2014-00680, Sep. 29, 2014, 25 pages.
Patent Owner's Preliminary Response, Submitted by Celgard, LLC in IPR2014-00680, Aug. 19, 2014, 38 pages.
Patent Owner's Response, Submitted by Celgard, LLC in IPR2014-00680, Feb. 6, 2015, 40 pages.
Love, et al., Observation of Lithium Dendrites at Ambient Temperature and Below, 2015, ECS Electrochemistry Letters, vol. 4, 5 Pages.
Petition for Inter Partes Review of U.S. Pat. No. 6,432,586, Submitted by SK Innovation Co., Ltd. in IPR2014-00680, May 9, 2014, 70 pages.
U.S. Naval Research Laboratory, Mechanical Coupling: Dendrite vs. Separator, APG-CWG Safety Panel Meeting, 3 Pages.
Battery University, Is Lithium-ion the Ideal Battery?, 18 pages.
Besenhard, et al., Excerpts from the Handbook of Battery Materials, 27 pages.
Besenhard, et al., Excerpts from the Handbook of Battery Materials, 15 pages.
Celgards Brief in Opp to Motion to Stay Preliminary Injuction, Submitted by LG Chem, Ltd. in IPR2014-00692, 14 Pages.
Corrected Petition for Inter Partes Review of U.S. Pat. No. 6,432,586, Submitted by LG Chem, Ltd. In IPR2014-00692, Apr. 25, 2014, 65 pages.
Patent Owner's Preliminary Response, Submitted by Celgard, LLC in IPR2015-01511, Oct. 9, 2015, 44 pages.

(56) References Cited

OTHER PUBLICATIONS

Declaration of Jongmoon Chin, Submitted by LG Chem, Ltd. in IPR2014-00692, 3 Pages.
Declaration of Kuzhikalail Abraham, Ph.D. in Support of Petitioner's Reply Submitted by Celgard, LLC in IPR2014-00692, 20 Pages.
Declaration of Kuzhikalail M. Abraham, Ph.D., Submitted by LG Chem, Ltd. in IPR2014-00692, 60 pages.
Zhang, Sheng Shui, A review on the separators of liquid electrolyte Li-ion batteries, 2007, Journal of Power Sources, vol. 164, 14 pages.
Patent Owner Response in IPR2014-00692, Submitted by Celgard, LLC in IPR2015-01511, 67 pages.
Declaration of Ralph E. White, Ph.D., P.E. ISO Preliminary Injunction, Submitted by LG Chem, Ltd. in IPR2014-00692, 14 Pages.
Love, Materials from IAPG-CWG Safety Panel Meeting, 3 Pages.
Declaration of Ralph E. White, Ph.D., P.E., Submitted by Celgard, LLC in IPR2014-00692, 96 Pages.
Declaration of Thomas Vander Veen, Ph.D., Submitted by LG Chem, Ltd. in IPR2014-00692, 21 Pages.
Declaration of William J. Paulus, Submitted by Celgard, LLC in IPR2014-00692, 17 Pages.
Declaration of William J. Paulus, Submitted by Celgard, LLC in IPR2014-00692, 10 Pages.
Depo Transcript in *SK Innovation* v *Celgard* IPR2014-00680, Submitted by LG Chem, Ltd. in IPR2014-00692, 189 pages.
Excerpt from Defendants Memo of Law (ECF 136), Submitted by Celgard, LLC in IPR2014-00692, 1 Page.
Excerpts from Apr. 23, 2015 Deposition of Ralph E. White, Ph.D., P.E., Submitted by LG Chem, Ltd. in IPR2014-00692, 59 pages.
Excerpts from Jan. 29, 2015 Deposition of Kuzhikalail M. Abraham, Ph.D., Submitted by Celgard, LLC in IPR2014-00692, 43 Pages.
Final Decision, Submitted by Patent Trial and Appeal Board in IPR2014-00692, Oct. 5, 2015, 52 pages.
Institution Decision, Submitted by Patent Trial and Appeal Board in IPR2014-00692, Oct. 8, 2014, 32 pages.
List of Materials Considered by Thomas Vander Veen, Ph.D., Submitted by LG Chem, Ltd. in IPR2014-00692, 1 Page.
Declaration by Dr. Michael G. Pecht, Submitted by Ube Maxell Co., Ltd., in IPR2015-01511, 168 pages.
Patent Owner's Preliminary Response, Submitted by Celgard, LLC in IPR2014-00692, Aug. 1, 2014, 58 pages.
Patent Owner's Response, Submitted by Celgard, LLC in IPR2014-00692, Feb. 6, 2015, 66 pages.
Patent Owner's Motion for Observation on Cross-Examination of Dr. Kuzhikalail Abraham, Submitted by Celgard, LLC in IPR2014-00692, Jun. 5, 2015, 16 pages.
Patent Owner's Motion for Observation on Cross-Examination of Dr. Thomas Vander Veen, Submitted by Celgard, LLC in IPR2014-00692, Jun. 5, 2015, 15 pages.
Patent Owner's Motion for Observation on Cross-Examination of Jongmoon Chin, Submitted by Celgard, LLC in IPR2014-00692, Jun. 5, 2015, 10 pages.
Decision Denying Institution, Submitted by Patent Trial and Appeal Board in IPR2015-01511, Jan. 7, 2016, 17 pages.
Petition for Inter Partes Review of U.S. Pat. No. 6,432,586, Submitted by LG Chem, Ltd. in IPR2014-00692, Apr. 25, 2014, 66 pages.
Petitioner's Response to Patent Owner's Observations of Testimony of Dr. Abraham, Submitted by LG Chem, Ltd. in IPR2014-00692, Jun. 10, 2015, 19 pages.
Petitioner's Response to Patent Owner's Observations on Testimony of Chin, Submitted by LG Chem, Ltd. in IPR2014-00692, Jun. 10, 2015, 14 pages.
Petitioner's Response to Patent Owner's Observations on Testimony of Dr. Vander Veen, Submitted by LG Chem, Ltd. in IPR2014-00692, Jun. 10, 2015, 17 pages.
Redacted Public Version of Excerpt from Defendants (ECF 136), Submitted by Celgard, LLC in 1PR2014-00692, 1 Page.
Supplemental Declaration of Kuzhikalail M. Abraham, Ph.D., Submitted by LG Chem, Ltd. in IPR2014-00692, 18 pages.
Venugopal, et al., Characterization of Microporous Separators for Lithium-Ion Batteries, 1999, Journal of Power Sources, vol. 77, 8 pages.
Arora, et al., Battery Separators, Submitted by Ube Maxell Co., Ltd. in IPR2015-01511, 2004, 44 pages.
Corrected Petition for Inter Partes Review of U.S. Pat. No. 6,432,586, Submitted by Ube Maxell Co., Ltd. in IPR2015-01511, Jun. 25, 2015, 70 pages.
Sigma-Aldrich, Lithium Hexafluorophosphate Solution in DMC, http://www.sigmaaldrich.com/catalog/producValdrich/746754?1ang=en&region=US.
Sigma-Aldrich, Lithium Hexafluorophosphate Solution in ECDMC, http://www.sigmaaldrich.com/catalog/producValdrich/7 46711 ?lang=en&region= US.
Sigma-Aldrich, Lithium Hexafluorophosphate Solution in ECEMC, http://www.sigmaaldrich.com/catalog/producValdrichl746738?1ang=en&region=US.
Sigma-Aldrich, Lithium Hexafluorophosphate Solution in EMC, http://www.sigmaaldrich.com/catalog/producValdrichf746762?1ang=en&region=US.
Sigma-Aldrich, Lithium Hexafluorophosphate Solution in PC, http://www.sigmaaldrich.com/catalog/producValdrich/746789?1ang=en&region=US.
Corrected Principal Brief of Appellant Celgard, LLC ,2016.
Brief for Intervenor—Director of the United States Patent and Trademark Office , 2016.
Reply Brief for Appellant Celgard, LLC, 2016.
(Corrected) Notice of Entry of Judgment without Opinion , 2016.
Appellant Celgard, LLC's Combined Petition for Panel Rehearing and Rehearing En Banc, 2017.
On Petition for Panel Rehearing and Rehearing En Banc Order,2017.
Application for a 30-Day Extension of Time to File Petition for a Writ of Certiorari , 2017.
Petition for a Writ of Certiorari, Submitted by Petitioner Celgard, LLC, 115 pages.
Supplemental Appendix, Submitted by Petitioner Celgard, LLC, 8 pages.
Brief for the Respondent, 12 pages.
Reply Brief for Petitioner, 12 pages.
Giridhar et al, "A Review on Lithium-Ion Polymer Electrolyte Batteries," Bulletin of Electrochemistry, CECRI, (vol. 14), (p. 414-418), (1999).
Prosini et al., "A Novel Intrinsically Porous Separator for Self-Standing Lithium-Ion Batteries;" Pergamon, Electrochimica Acta, (vol. 48), (p. 227-233), (2002).
Kim et al., "Liquid-Liquid Phase Sepraration in Polysulfone/Solvent/Water Systems," Journal of Applied Polymer Science, John Wiley & Sons, Inc., (vol. 65), (p. 2643-2653), (1997).
Vogrin et al., "The Wet Phase Separation: The Effect of Cast Solution Thickness on the Appearance of Macrovoids in the Membrane Forming Ternary Cellulose Acetate/Acetone/Water System," Journal of Membrane Science, Elsevier Science B.V., (vol. 207), (p. 139-141), (2002).
Cheng et al., "PVDF Membrane Formation by Diffusion-Induced Phase Separation-Morphology Prediction Based on Phase Behavior and Mass Transfer Modeling," Journal of Polymer Science, John Wiley & Sons, Inc., (vol. 37), (p. 2079-2092), (1999).
Cheng, "Effect of Temperature on the Formation of Microporous PVDF Membranes by Precipitation from 1-Octanol/DMF/PVDF and Water/DMF/PVDF Systems," Macromolecules, American Chemical Society, (vol. 32), (p. 6668-6674), (1999).
Zhang, "Advanced Gel Polymer Electrolyte for Lithium-Ion Polymer Batteries," Graduate Theses and Dissertations, Paper 13515, Digital Repository @ Iowa State University, (2013).
Young et al., "Mechanisms of PVDF Membrane Formation by Immersion-Precipitation in Soft (1-Octanol) and Harsh (Water) Nonsolvents," Polymer, Elsevier Science Ltd., (vol. 40), (p. 5315-5323), (1999).

(56) References Cited

OTHER PUBLICATIONS

Matsuyama et al., "Preparation of Porous Membrane by Combined Use of Thermally Induced Phase Separation and Immersion Precipitation," Polymer, Elsevier Science Ltd., (vol. 43), (p. 5243-5248), (2002).
Nichias, "Technical Report," (2000).
Order denying Petition for a Writ of Certiorari in *Celgard* v. *Iancu,* 9 pages, 2018.
Petition for a Writ of Certiorari, Submitted by Petitioner Celgard, LLC, 115 pages , 2017.
Supplemental Appendix, Submitted by Petitioner Celgard, LLC, 8 pages, 2017.
Brief for the Respondent, 12 pages , 2017.
Reply Brief for Petitioner, 12 pages, 2017.
Product Datasheet, "Properties of Celgard 2400 Microporous Film," Jul. 1983.
Product Datasheet, "Properties of Celgard 2400 Microporous Film," Mar. 1985.
Product Datasheet, "Properties of Celgard 2500 Microporous Film," Mar. 1985.
Grady, Eveready Battery Company, The 20th International Seminar & Exhibit on Primary & Secondary Batteries, "New Product Concepts from Energizer", Fort Lauderdale, FL, Mar. 17-20, 2003.
Proceedings of the 38th Power Sources Conference, Jun. 8-11, 1998.
Chen et al., "Structural Characterization of Celgard Microporous Membrane Precursors: Melt-Extruded Polyethylene Fims," Journal of Applied Polymer Science, vol. 53, 471-483 (1994).
Sarada et al., "Three Dimensional Structure of Celgard Microporous Membranes," Journal of Membrane Science, 15 (1983) 97-113, Elsevier Scientific Publishing Company, Amsterdam.
Wang, et al., Poly(ethylene oxide)-silica hybrid materials for lithium battery application, 1999, Elsevier Science B.V., 39(4), pp. 206-210.*

* cited by examiner

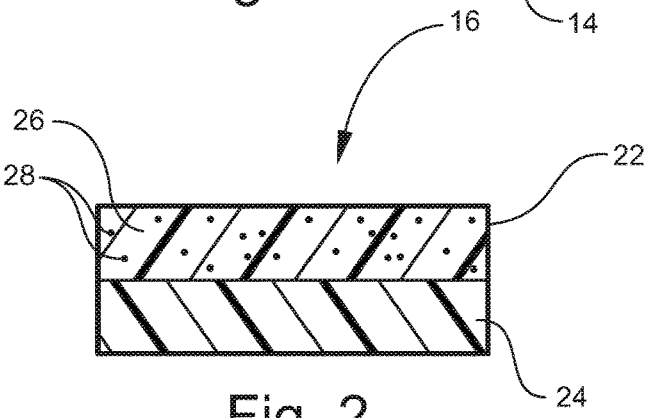
Fig. 2
Amended

SEPARATOR FOR A HIGH ENERGY RECHARGEABLE LITHIUM BATTERY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

A separator for a high energy rechargeable lithium battery and a high energy rechargeable lithium battery are disclosed herein.

BACKGROUND OF THE INVENTION

A high energy rechargeable lithium battery has an anode with an energy capacity of at least 372 milliampere-hours/gram (mAh/g). Such anodes include, for example, lithium metal, lithium alloys (e.g. lithium aluminum), and mixtures of lithium metal or lithium alloys and materials such as carbon, nickel, and copper. Such anodes exclude anodes solely with lithium intercalation or lithium insertion compounds.

The commercial success of lithium metal or lithium alloy batteries has eluded all but primary cells due to persistent safety problems.

The difficulties associated with the use of the foregoing anodes stem mainly from lithium dendrite growth that occurs after repetitive charge-discharge cycling. (While dendrite growth is a potential problem with any lithium battery, the severity of the problem with the above-mentioned high energy anodes is much greater than with other lithium anodes (e.g. pure carbon intercalation anodes) as is well known in the art.) When lithium dendrites grow and penetrate the separator, an internal short circuit of the battery occurs (any direct contact between anode and cathode is referred to as "electronic" shorting, and contact made by dendrites is a type of electronic shorting). Some shorting (i.e., a soft short), caused by very small dendrites, may only reduce the cycling efficiency of the battery. Other shorting may result in thermal runaway of the lithium battery, a serious safety problem for lithium rechargeable battery.

The failure to control the dendrite growth from such anodes remains a problem, limiting the commercialization of cells with those anodes, particularly those cells with liquid organic electrolytes.

Accordingly, there is a need to improve high energy rechargeable lithium batteries.

SUMMARY OF THE INVENTION

The instant invention is directed to a separator for a high energy rechargeable lithium battery and the corresponding battery. The separator includes at least one ceramic composite layer and at least one polymeric microporous layer. The ceramic composite layer includes a mixture of inorganic particles and a matrix material. The ceramic composite layer is adapted, at least, to block dendrite growth and to prevent electronic shorting. The polymeric layer is adapted, at least, to block ionic flow between the anode and the cathode in the event of thermal runaway.

DETAILED DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is a cross-sectional view of the separator.

DETAILED DESCRIPTION OF THE INVENTION

Figure 1:
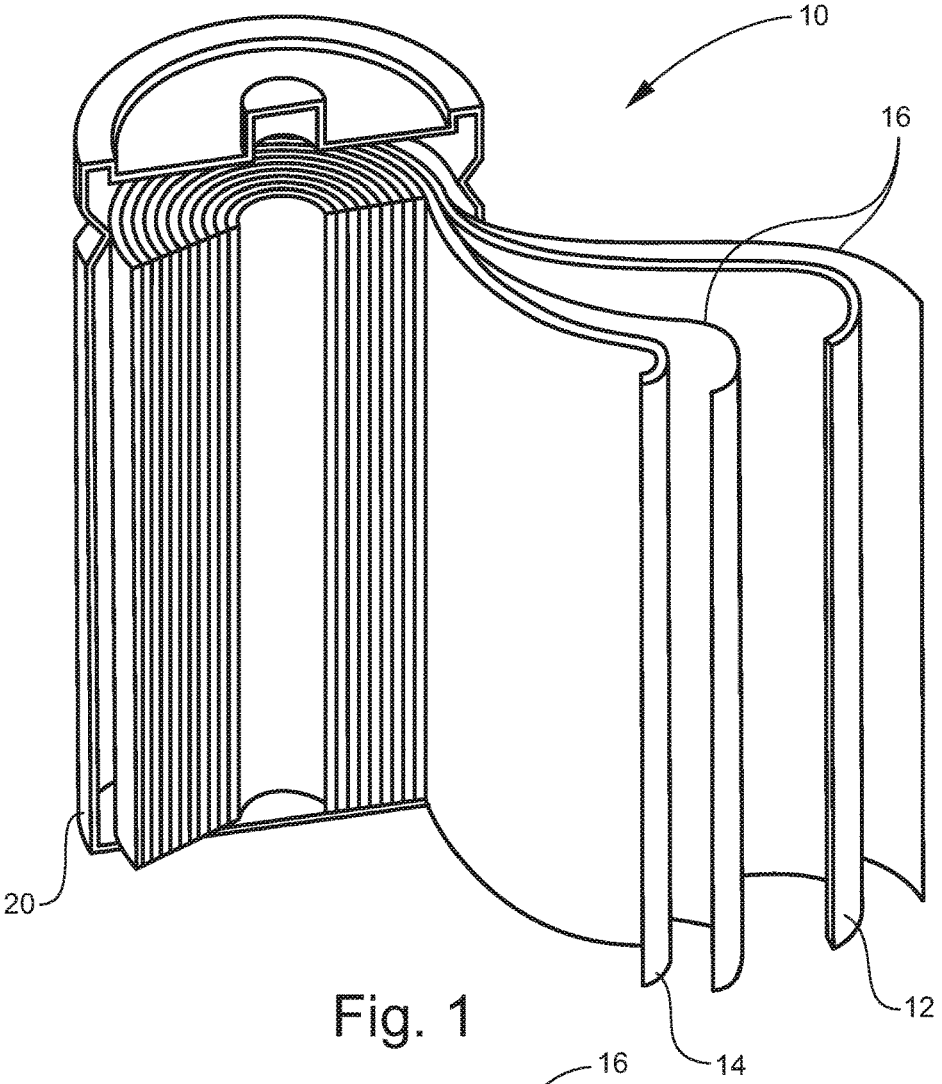
FIG. 1 is a sectional view of a lithium metal battery.

Referring to the figures, wherein like numerals indicate like elements, there is shown in FIG. 1 a lithium metal battery (or cell) 10. Lithium metal cell 10 comprises a lithium metal anode 12, a cathode 14, and a separator 16 disposed between anode 12 and cathode 14, all of which is packaged within a can 20. The illustrated cell 10 is a cylindrical cell or 'jelly roll' cell, but the invention is not so limited. Other configurations, for example, prismatic cells, button cells, or polymer cells are also included. Additionally, not shown is the electrolyte. The electrolyte may be a liquid (organic or inorganic), or a gel (or polymer). The invention will be, for convenience, described with regard to a c ylindrical cell with a liquid organic electrolyte, but it is not so limited and may find use in other cell types (e.g. energy storage system, combined cell and capacitor) and configurations.

The anode 12 should have an energy capacity greater than or equal to 372 mAh/g, preferably ≥700 mAh/g, and most preferably ≥1000 mAH/g. Anode 12 may be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode 12 is not made solely from intercalation compounds containing lithium or insertion compounds containing lithium.

The cathode 14 may be any cathode compatible with the anode and may include an intercalation compound, an insertion compound, or an electrochemically active polymer. Suitable intercalation materials includes, for example, $MoS_2$, $FeS_2$, $MnO_2$, $TiS_2$, $NbSe_3$, $LiCoO_2$, $LiNiO_2$, $LiMn_2O_4$, $V_6O_{13}$, $V_2O_5$, and $CuCl_2$. Suitable polymers include, for example, polyacetylene, polypyrrole, polyaniline, and polythiopene.

The electrolyte may be liquid or gel (or polymer). Typically, the electrolyte primarily consists of a salt and a medium (e.g. in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, MN) and combinations thereof. Solvents may include, for example, ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethylmethyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF:chlorotrifluoro ethylene) PAN (polyacrylonitrile), and PEO (polyethylene oxide).

Referring to FIG. 2, separator 16 is shown. Separator 16 comprises a ceramic composite layer 22 and a polymeric microporous layer 24. The ceramic composite layer is, at least, adapted for preventing electronic shorting (e.g. direct or physical contact of the anode and the cathode) and blocking dendrite growth. The polymeric microporous layer is, at least, adapted for blocking (or shutting down) ionic conductivity (or flow) between the anode and the cathode during the event of thermal runaway. The ceramic composite layer 22 of separator 16 must be sufficiently conductive to allow ionic flow between the anode and cathode, so that current, in desired quantities, may be generated by the cell. The layers 22 and 24 should adhere well to one another, i.e. separation should not occur. The layers 22 and 24 may be formed by lamination, coextrusion, or coating processes. Ceramic composite layer 22 may be a coating or a discrete layer, either having a thickness ranging from 0.001 micron to 50 microns, preferably in the range of 0.01 micron to 25 microns. Polymeric microporous layer 24 is preferably a discrete membrane having a thickness ranging from 5 microns to 50 microns, preferably in the range of 12 microns to 25 microns. The overall thickness of separator 16 is in the range of 5 microns to 100 microns, preferably in the range of 12 microns to 50 microns.

Ceramic composite layer 22 comprises a matrix material 26 having inorganic particles 28 dispersed therethrough. Ceramic composite layer 22 is nonporous (it being understood that some pores are likely to be formed once in contact with an electrolyte, but ion conductivity of layer 22 is primarily dependent upon choice of the matrix material 26 and particles 28). The matrix material 26 of layer 22 differs from the foregoing polymer matrix (i.e., that discussed above in regard to the medium of the electrolyte) in, at least, function. Namely, matrix material 26 is that component of a separator which, in part, prevents electronic shorting by preventing dendrite growth; whereas, the polymer matrix is limited to the medium that carries the dissociated salt by which current is conducted within the cell. The matrix material 26 may, in addition, also perform the same function as the foregoing polymer matrix (e.g. carry the electrolyte salt). The matrix material 26 comprises about 5-80% by weight of the ceramic composite layer 22, and the inorganic particles 28 form approximately 20-95% by weight of the layer 22. Preferably, composite layer 22 contains inorganic particles 30%-75% by weight. Most preferably, composite layer 22 contains inorganic particles 40%-60% by weight.

The matrix material 26 may be ionically conductive or non-conductive, so any gel forming polymer suggested for use in lithium polymer batteries or in solid electrolyte batteries may be used. The matrix material 26 may be selected from, for example, polyethylene oxide (PEO), polyvinylidene fluoride (PVDF), polytetrafluoroethylene (PTFE), polyurethane, polyacrylonitrile (PAN), polymethylmethacrylate (PMMA), polytetraethylene glycol diacrylate, copolymers thereof, and mixtures thereof. The preferred matrix material is PVDF and/or PEO and their copolymers. The PVDF copolymers include PVDF:HFP (polyvinylidene fluoride:hexafluoropropylene) and PVDF:CTFE (polyvinylidene fluoride:chlorotrifluoroethylene). Most preferred matrix materials include PVDF:CTFE with less than 23% by weight CTFE, PVDH:HFP with less than 28% by weight HFP, any type of PEO, and mixtures thereof.

The inorganic particles 28 are normally considered non-conductive, however, these particles, when in contact with the electrolyte, appear, the inventor, however, does not wish to be bound hereto, to develop a superconductive surface which improves the conductivity (reduces resistance) of the separator 16. The inorganic particles 28 may be selected from, for example, silicon dioxide ($SiO_2$), aluminum oxide ($Al_2O_3$), calcium carbonate ($CaCO_3$), titanium dioxide ($TiO_2$), $SiS_2$, $SiPO_4$ and the like, or mixtures thereof. The preferred inorganic particle is $SiO_2$, $Al_2O_3$, and $CaCO_3$. The particles may have an average particle size in the range of 0.001 micron to 25 microns, most preferably in the range of 0.01 micron to 2 microns.

The microporous polymeric layer 24 consists of any commercially available microporous membranes (e.g. single ply or multi-ply), for example, those products produced by Celgard Inc. of Charlotte, North Carolina, Asahi Chemical of Tokyo, Japan, and Tonen of Tokyo, Japan. The layer 24 has a porosity in the range of 20-80%, preferably in the range of 28-60%. The layer 24 has an average pore size in the range of 0.02 to 2 microns, preferably in the range of 0.08 to 0.5 micron. The layer 24 has a Gurley Number in the range of 15 to 150 sec, preferably 30 to 80 sec. (Gurley Number refers to the time it takes for 10 cc of air at 12.2 inches of water to pass through one square inch of membrane.) The layer 24 is preferably polyolefinic. Preferred polyolefins include polyethylene and polypropylene. Polyethylene is most preferred.

The foregoing separator, while primarily designed for use in high energy rechargeable lithium batteries, may be used in other battery systems in which dendrite growth may be a problem.

The foregoing shall be further illustrated with regard to the following non-limiting examples.

EXAMPLES

Sixty (60) parts of fine particle calcium carbonate, 40 parts of PVDF:HFP (Kynar 2801), are dissolved in 100 parts of acetone at 35° C. for 3 hours under high shear mixing. The solution is cast into a 15 micron film. After vaporization of the actone at room temperature, the composite film was thermally laminated with 2 layers (8 microns) of Celgard 2801 membrane. The resulting composite shutdown separator has a structure of PE/composite/PE and a thickness of 30 microns.

Thirty (30) parts of silicon dioxide, 30 parts of calcium carbonate, 40 parts of PVDF:HFP (Kynar 2801) are dissolved in 100 parts of acetone at 35° C. for 3 hours under high shear mixing. This solution was cast or coated onto a 23 micron layer of a polyethylene microporous layer made by Celgard Inc. After vaporization of the acetone at room temperature, the polyethylene/composite membrane had a thickness of 38 microns.

The present invention may be embodied in other specific forms without departing from the spirit or essential attributes thereof and, accordingly, reference should be made to the appended claims, rather than to the foregoing specification, as indicating the scope of the invention.

What is claimed is:

[1. A separator for a high energy rechargeable lithium battery comprises:

at least one ceramic composite layer, said layer including a mixture of inorganic particles in a matrix material; said layer being adapted to at least block dendrite growth and to prevent electronic shorting; and at least one polyolefinic microporous layer, said layer being adapted to block ionic flow between an anode and a cathode.]

[2. The separator according to claim 1 wherein said mixture comprises between 20% to 95% by weight of said inorganic particles and between 5% to 80% by weight of said matrix material.]

[3. The separator according to claim 1 wherein said inorganic particles are selected from the group consisting of $SiO_2$, $Al_2O_3$, $CaCO_3$, $TiO_2$, $SiS_2$, $SiPO_4$, and mixtures thereof.]

[4. The separator according to claim 1 wherein said matrix material is selected from the group consisting of polyethylene oxide, polyvinylidene fluoride, polytetrafluoroethylene, polyurethane, polyacrylonitrile, polymethylmethacrulate, polytetraethylene glycol diacrylate, copolymers thereof, and mixtures thereof.]

[5. The separator according to claim 1 wherein said polyolefinic microporous layer is a polyolefinic membrane.]

[6. The separator according to claim 5 wherein said polyolefinic membrane is a polyethylene membrane.]

[7. A separator for a high energy rechargeable lithium battery comprises:

at least one ceramic composite layer or coating, said layer including a mixture of 20-95% by weight of inorganic particles selected from the group consisting of $SiO_2$, $Al_2O_3$, $CaCO_3$, $TiO_2$, $SiS_2$, $SiPO_4$, and mixtures thereof, and 5-80% by weight of a matrix material selected from the group consisting of polyethylene oxide, polyvinylidene fluoride, polytetrafluoroethylene, copolymers of the foregoing, and mixtures thereof; and at least one polyolefinic microporous layer having a porosity in the range of 20-80%, an average pore size in the range of 0.02 to 2 microns, and a Gurley Number in the range of 15 to 150 sec.]

[8. The separator according to claim 7 wherein said inorganic particles have an average particle size in the range of 0.001 to 24 microns.]

[9. The separator according to claim 7 wherein said inorganix particles are selected from the group consisting of $SiO_2$, $Al_2O_3$, $CaCO_3$, and mixtures thereof.]

[10. The separator according to claim 7 wherein said matrix material is selected from the group consisting of polyvinylidene fluoride and/or polyethylene oxide, their copolymers, and mixtures thereof.]

[11. A high energy rechargeable lithium battery comprising:

an anode containing lithium metal or lithium-alloy or a mixtures of lithium metal and/or lithium alloy and another material;

a cathode;

a separator according to claims 1-10 disposed between said anode and said cathode; and an electrolyte in ionic communication with said anode and said cathode via said separator.]

12. A separator for an energy storage system comprises:

at least one ceramic composite layer or coating, said layer including a mixture of 20-95% by weight of inorganic particles selected from the group consisting of $SiO_2$, $Al_2O_3$, $CaCO_3$, $TiO_2$, $SiS_2$, $SiPO_4$, [and the like] and mixtures thereof, and 5-80% by weight of a matrix material selected from the group consisting of polyethylene oxide, polyvinylidene fluoride, polytetrafluoroethylene, copolymers of the foregoing, and mixtures thereof, said layer being adapted to at least block dendrite growth and to prevent electronic shorting; and at least one polyolefinic microporous layer having a porosity in the range of 20-80%, an average pore size in the range of 0.02 to 2 microns, and a Gurley Number in the range of 15 to 150 sec, said layer being adapted to block ionic flow between an anode and a cathode.

*13. A separator for a rechargeable lithium battery comprising:*

*at least one ceramic composite layer wherein the ceramic composite layer includes a mixture of inorganic particles in a matrix material and wherein the ceramic composite layer is adapted to at least block dendrite growth after repetitive charge-discharge cycling and to prevent electronic shorting, wherein the ceramic composite layer is nonporous such that pores are formed once in contact with an electrolyte; and*

*at least one polyolefinic microporous layer wherein the layer is adapted to block ionic flow between an anode and a cathode.*

*14. The separator according to claim 13 wherein the ceramic composite layer is a coating.*

*15. The separator according to claim 14 wherein the coating thickness is in the range of about 0.01 to 25 microns.*

*16. The separator according to claim 13 wherein the matrix material comprises polyethylene oxide (PEO), polyvinylidene fluoride (PVDF), polytetrafluoroethylene (PTFE), polyurethane, polyacrylonitrile (PAN), polymethylmethacrylate (PMMA), polytetraethylene glycol diacrylate, copolymers thereof, or mixtures thereof.*

*17. The separator according to claim 16 wherein the matrix material comprises polyvinylidene fluoride (PVDF), polyethylene oxide (PEO), copolymers thereof, or mixtures thereof.*

*18. The separator according to claim 13 wherein the matrix material comprises a gel forming polymer.*

*19. The separator according to claim 13 wherein the matrix material is a continuous material in which the inorganic particles are embedded.*

*20. The separator according to claim 13 wherein the inorganic particles have an average particle size in the range of 0.001 to 24 microns.*

*21. The separator according to claim 13 wherein the inorganic particles comprise silicon dioxide ($SiO_2$), aluminum oxide ($Al_2O_3$), calcium carbonate ($CaCO_3$), titanium dioxide ($TiO_2$), $SiS_2$, $SiPO_4$, or mixtures thereof.*

*22. The separator according to claim 13 wherein the inorganic particles comprise silicon dioxide ($SiO_2$), aluminum oxide ($Al_2O_3$), calcium carbonate ($CaCO_3$), or mixtures thereof.*

*23. The separator according to claim 13 wherein the polyolefinic microporous layer comprises polyethylene or polypropylene.*

*24. The separator according to claim 13 wherein the polyolefinic microporous layer is a polyolefinic membrane.*

*25. The separator according to claim 24 wherein the polyolefinic membrane is a polyethylene membrane.*

*26. The separator according to claim 13 wherein the ceramic composite layer prevents electronic shorting by eliminating soft shorts caused by dendrites.*

*27. The separator according to claim 13 wherein the ceramic composite layer prevents electronic shorting by eliminating soft shorts caused by dendrites that grow during repetitive charge-discharge cycling.*

*28. A separator for a rechargeable lithium battery comprising:*

*at least one ceramic composite layer, wherein the ceramic composite layer comprises:*

*a mixture of about 20-95% by weight of inorganic particles, and*

*about 5-80% by weight of a matrix material,*

*wherein the ceramic composite layer is adapted to at least block dendrite growth after repetitive charge-discharge cycling and thereby to prevent electronic shorting and the ceramic composite layer is nonporous such that pores are formed once in contact with an electrolyte; and*

*at least one polyolefinic microporous layer having a porosity in the range of about 20-80%, an average pore size in the range of about 0.02 to 2 microns, and*

*wherein the polyolefinic microporous layer is adapted to block ionic flow between an anode and a cathode.*

*29. The separator according to claim 28 wherein the ceramic composite layer is a coating.*

*30. The separator according to claim 29 wherein the coating thickness is in the range of about 0.01 to 25 microns.*

*31. The separator according to claim 28 wherein the matrix material comprises polyethylene oxide (PEO), polyvinylidene fluoride (PVDF), polytetrafluoroethylene (PTFE), polyurethane, polyacrylonitrile (PAN), polymethylmethacrylate (PMMA), polytetraethylene glycol diacrylate, copolymers thereof, or mixtures thereof.*

*32. The separator according to claim 31 wherein the matrix material comprises polyvinylidene fluoride (PVDF), polyethylene oxide (PEO), copolymers thereof, or mixtures thereof.*

*33. The separator according to claim 28 wherein the matrix material comprises a gel forming polymer.*

*34. The separator according to claim 28 wherein the matrix material is a continuous material in which the inorganic particles are embedded.*

*35. The separator according to claim 28 wherein the inorganic particles have an average particle size in the range of about 0.001 to 24 microns.*

*36. The separator according to claim 28 wherein the inorganic particles comprise silicon dioxide ($SiO_2$), aluminum oxide ($Al_2O_3$), calcium carbonate ($CaCO_3$), titanium dioxide ($TiO_2$), $SiS_2$, $SiPO_4$, or mixtures thereof.*

*37. The separator according to claim 36 wherein the inorganic particles comprise silicon dioxide ($SiO_2$), aluminum oxide ($Al_2O_3$), calcium carbonate ($CaCO_3$), or mixtures thereof.*

*38. The separator according to claim 28 wherein the ceramic composite layer prevents electronic shorting by eliminating soft shorts caused by dendrites.*

*39. The separator according to claim 28 wherein the ceramic composite layer prevents electronic shorting by eliminating soft shorts caused by dendrites that grow during repetitive charge-discharge cycling.*

* * * * *